United States Patent
Fujisawa

(10) Patent No.: US 9,097,311 B2
(45) Date of Patent: Aug. 4, 2015

(54) GEARED MOTOR

(71) Applicant: NIDEC COPAL CORPORATION, Tokyo (JP)

(72) Inventor: Keisuke Fujisawa, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 14/098,360

(22) Filed: Dec. 5, 2013

(65) Prior Publication Data

US 2014/0157926 A1 Jun. 12, 2014

(30) Foreign Application Priority Data

Dec. 7, 2012 (JP) .................................. 2012-268498

(51) Int. Cl.
| | |
|---|---|
| *H02K 7/116* | (2006.01) |
| *F16H 1/12* | (2006.01) |
| *F16H 1/20* | (2006.01) |
| *F16H 57/00* | (2012.01) |
| *F16H 1/06* | (2006.01) |
| *F16H 35/10* | (2006.01) |
| *F16D 7/00* | (2006.01) |
| *F16D 7/04* | (2006.01) |

(52) U.S. Cl.
CPC *F16H 1/06* (2013.01); *F16D 7/002* (2013.01); *F16H 35/10* (2013.01); *F16D 7/048* (2013.01); *Y10T 74/19679* (2015.01)

(58) Field of Classification Search
CPC ......... F16H 55/14; F16H 35/00; F16H 35/10; F16H 2035/103; F16H 2055/178; F16H 57/00; F16H 57/0006; F16D 7/048; F16D 43/20; F16D 43/202; F16D 7/00; F16D 7/04

USPC ....... 74/411, 421 A, 421 R; 192/56.1; 464/37
See application file for complete search history.

(56) References Cited

U.S. PATENT DOCUMENTS

| | | | | |
|---|---|---|---|---|
| 4,702,122 | A * | 10/1987 | Richard | 74/412 TA |
| 5,242,154 | A * | 9/1993 | Schmidt | 254/323 |
| 5,601,491 | A * | 2/1997 | Chan et al. | 464/37 |
| 7,828,662 | B2 * | 11/2010 | Hofschulte et al. | 464/37 |
| 2002/0000135 | A1 * | 1/2002 | Zaps | 74/411 |
| 2013/0237328 | A1 * | 9/2013 | Billings et al. | 464/37 |

FOREIGN PATENT DOCUMENTS

JP 2012-62963 3/2012

* cited by examiner

*Primary Examiner* — Justin Krause
(74) *Attorney, Agent, or Firm* — Troutman Sanders LLP

(57) ABSTRACT

A geared motor reduces a speed of rotation of a DC motor with a gear train and outputs the rotation to the outside. The gear train includes a second gear including a cylindrical portion a third gear a first insertion portion that is inserted in the cylindrical portion the second gear. The second gear and the third gear are made of a resin material. A projecting-and-recessed portion is provided on an inner peripheral surface of the cylindrical portion of the second gear. The projecting-and-recessed portion extends continuously in a circumferential direction over the entire circumference of the inner peripheral surface of the cylindrical portion. Pressing portions are evenly arranged in the circumferential direction on an outer peripheral surface of the first insertion portion of the third gear. The pressing portions are configured enter recesses in the projecting-and-recessed portion and press wall surfaces of the recesses.

4 Claims, 8 Drawing Sheets

GEARED MOTOR

CROSS REFERENCES TO RELATED APPLICATIONS

The present invention contains subject matter related to Japanese Patent Application No. 2012-268498 filed in the Japan Patent Office on Dec. 7, 2012, the entire contents of which are incorporated herein by reference.

BACKGROUND OF THE INVENTION

1. Field of the Invention

The present invention relates to a small geared motor mounted in a precision apparatus, such as an amusement apparatus, an audio-visual apparatus, a medical apparatus, or a camera.

2. Description of the Related Art

Japanese Unexamined Patent Application Publication No. 2012-62963 discloses a technology in this field. This document describes a reduction gear mechanism including a clutch that stops transmitting power between an output shaft and a gear member in case of overload. In this reduction gear mechanism, the gear member includes a shaft-receiving portion in which the output shaft is rotatably inserted and an outer cylindrical portion that surrounds the shaft-receiving portion. A coil spring is disposed between the shaft-receiving portion and the outer cylindrical portion. The coil spring urges the shaft-receiving portion in a radially inward direction. The reduction gear mechanism includes a torque limiter which utilizes a frictional force applied between an inner peripheral surface of the shaft-receiving portion and an outer peripheral surface of the output shaft to transmit or stop transmitting power between the gear member and the output shaft.

However, with the above-described torque limiter, if the output shaft is locked for any cause, the gear member continuously rotates with respect to the output shaft while the frictional force is applied between the inner peripheral surface of the shaft-receiving portion and the outer peripheral surface of the output shaft in the circumferential direction. Accordingly, the outer peripheral surface of the output shaft and the inner peripheral surface of the shaft-receiving portion are gradually worn, and the output shaft easily slips along the gear member. As a result, stability of rotation of the output shaft with respect to the gear member is gradually reduced, and there is a risk that the rotating force cannot be reliably transmitted from the gear member to the output shaft.

SUMMARY OF THE INVENTION

Accordingly, an object of the present invention is to provide a geared motor capable of reliably transmitting a rotating force while avoiding unstable rotation.

To achieve the above-described object, according to an aspect of the present invention, a geared motor, which reduces a speed of rotation of a motor with a plurality of gears and outputs the rotation to the outside, includes the plurality of gears including a first gear unit and a second gear unit. The first gear unit includes a cylindrical portion. The second gear unit includes a first insertion portion that is inserted in the cylindrical portion of the first gear unit. The first gear unit and the second gear unit are made of a resin material. An inner peripheral surface of the cylindrical portion of the first gear unit includes a projecting-and-recessed portion that extends continuously in a circumferential direction over the entire circumference of the inner peripheral surface of the cylindrical portion. Pressing portions are evenly arranged in the circumferential direction on an outer peripheral surface of the first insertion portion of the second gear unit, the pressing portions being configured to enter recesses included in the projecting-and-recessed portion and press wall surfaces of the recesses.

In the geared motor according to the aspect of the present invention, the first insertion portion of the second gear unit made of a resin is inserted in the cylindrical portion of the first gear unit made of a resin, and the inner peripheral surface of the cylindrical portion is pressed by the pressing portions on the first insertion portion. Thus, the second gear unit is lightly press-fitted to the first gear unit in the axial direction. When the first gear unit or the second gear unit is locked, the pressing portions on the first insertion portion of the second gear unit move along the inner peripheral surface of the cylindrical portion of the first gear unit in the circumferential direction. The pressing portions on the first insertion portion move along the projecting-and-recessed portion of the inner peripheral surface of the cylindrical portion, so that torque is not transmitted between the first gear unit and the second gear unit. Thus, according to the aspect of the present invention, the pressing portions on the first insertion portion of the second gear unit move along the projecting-and-recessed portion of the inner peripheral surface of the first gear unit to stop the transmission of torque. Since the inner peripheral surface of the cylindrical portion of the first gear unit is pressed by the pressing portions on the first insertion portion of the second gear unit, the rotating force can be reliably transmitted between the first gear unit and the second gear unit. When viewed in the axial direction, the projecting-and-recessed portion of the inner peripheral surface of the cylindrical portion of the first gear unit is formed over the entire circumference, and the pressing portions on the first insertion portion of the second gear unit are evenly arranged in the circumferential direction. Therefore, rattling of the second gear unit with respect to the first gear unit can be suppressed and rotation of the second gear unit with respect to the first gear unit can be stabilized.

The second gear unit may further include a second insertion portion that projects from an inner region of the first insertion portion in an axial direction and that is inserted in a center hole in the first gear unit. An engagement projection may be provided on an outer peripheral surface of the second insertion portion, the engagement projection being engaged with an engagement recess in a wall surface of the center hole in the axial direction.

In this geared motor, the second gear unit further includes the second insertion portion that is inserted in the center hole in the first gear unit, and the engagement projection, which is engaged with the engagement recess in the wall surface of the center hole in the axial direction, is provided on the outer peripheral surface of the second insertion portion. Thus, the engagement projection of the second insertion portion of the second gear unit is placed in the engagement recess in the center hole of the first gear unit. Therefore, when a force is applied to the first gear unit or the second gear unit in the axial direction, the engagement projection of the second gear unit contacts a wall surface of the engagement recess in the first gear unit. Thus, movement of the second gear unit with respect to the first gear unit in the axial direction is regulated, and the second gear unit is reliably prevented from being pulled out from the first gear unit.

Each of the pressing portions may be a projection having a curved end, and the wall surface of each of the recesses in the inner peripheral surface of the cylindrical portion of the first gear unit may be curved between two reference lines, which are tangent lines of the wall surface, when viewed in an axial direction, the two reference lines forming an obtuse angle.

In this geared motor, each of the pressing portions provided on the outer peripheral surface of the first insertion portion of the second gear unit is the projection having a curved end, and the wall surface of each of the recesses in the inner peripheral surface of the cylindrical portion of the first gear unit is gently curved such that the two reference lines form an obtuse angle. If, for example, the radius of curvature of the wall surface of each of the recesses in the inner peripheral surface of the cylindrical portion of the first gear unit is reduced so that the two reference lines form an acute angle, the second gear unit is not easily pulled out from the first gear unit since the pressing portions of the second gear unit fit into the recesses in the inner peripheral surface of the first gear unit and press the inner peripheral surface of the first gear unit. However, in a locked state, the pressing force applied by the pressing portions of the second gear unit tends to concentrate at projections on the inner peripheral surface of the first gear unit. Since the pressing portions of the second gear unit try to move in the circumferential direction while pressing the projections on the inner peripheral surface of the first gear unit, the projections on the inner peripheral surface of the first gear unit wear away. In contrast, according to the aspect of the present invention, the pressing portions of the second gear unit have curved ends, and the wall surfaces of the recesses in the first gear unit are gently curved. Therefore, the pressing force applied by the pressing portions of the second gear unit to the inner peripheral surface of the first gear unit in the circumferential direction is small, and the pressing portions of the second gear unit move smoothly along the wall surfaces of the recesses in the first gear unit. Therefore, the projections on the inner peripheral surface of the first gear unit do not easily wear away. Thus, according to the aspect of the present invention, the pressing portions of the second gear unit can be moved smoothly along the inner peripheral surface of the first gear unit in the circumferential direction in the locked state, and wear of the projections on the inner peripheral surface of the first gear unit can be reduced.

According to the present invention, unstable rotation can be avoided and a rotating force can be reliably transmitted.

DESCRIPTION OF THE PREFERRED EMBODIMENTS

A geared motor according to a preferred embodiment of the present invention will be described in detail with reference to the drawings.

Figure 1:
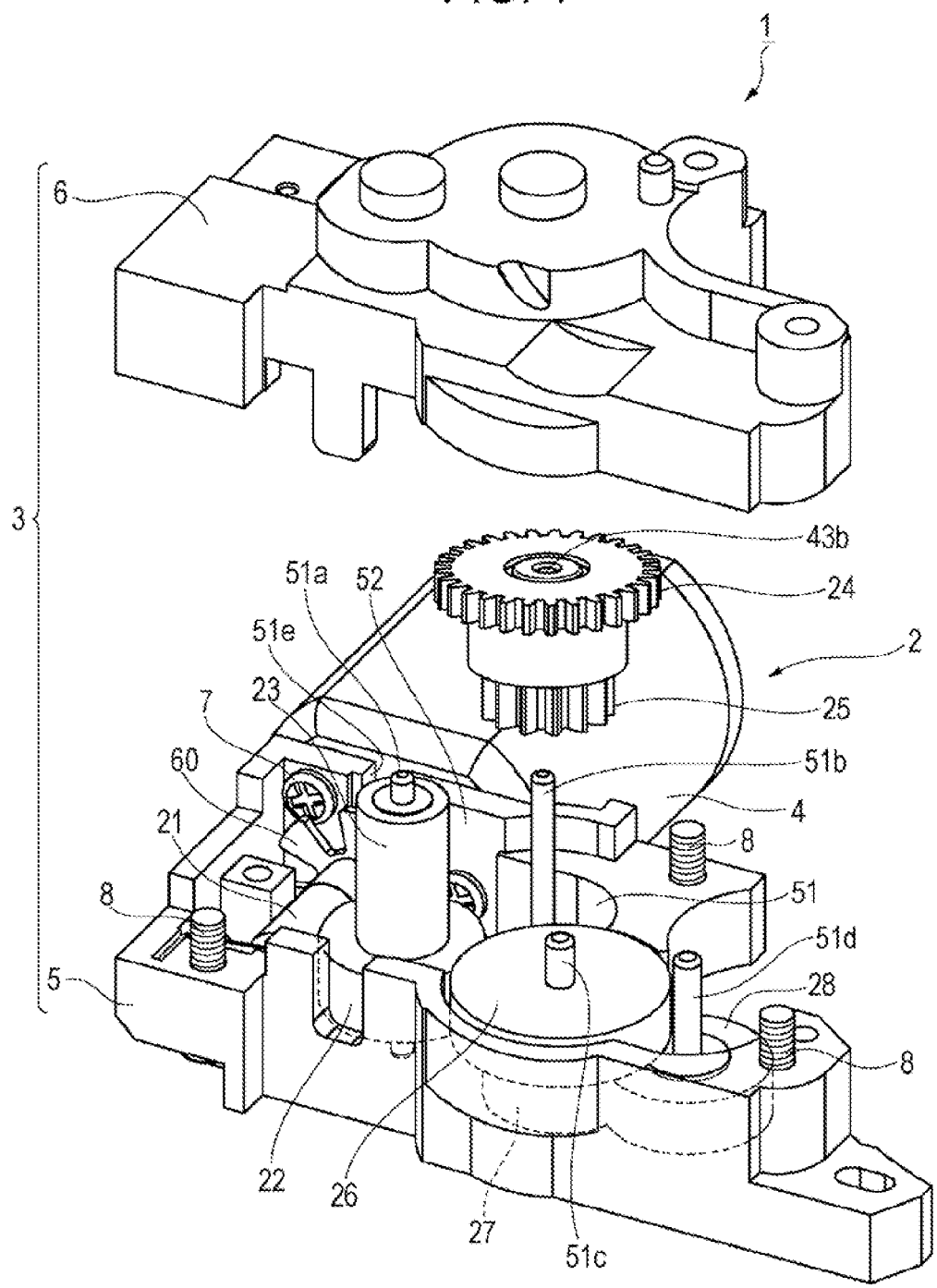
FIG. 1 is a perspective view of a geared motor according to an embodiment of the present invention.

A geared motor 1 illustrated in FIG. 1 is mounted in an electronic apparatus, such as an amusement apparatus, an audio-visual apparatus, a medical apparatus, or a camera, and is used as a small unit in a mechanical section of the electronic apparatus. The geared motor 1 reduces a speed of rotation of a DC motor 4 with a gear train 2 and outputs the rotation to the outside. The geared motor 1 includes a gear box 3 made of a resin that houses the gear train 2, which includes a plurality of gears that constitute a speed reduction mechanism. The gear box 3 includes a gear holder 5, and the DC motor 4 is fastened with screws to a side wall of the gear holder 5. The gear box 3 includes the gear holder 5, which is made of a resin and which has an accommodation recess 51 for accommodating the gear train 2, and a gear cover 6, which is also made of resin and which blocks an open side of the gear holder 5. The gear cover 6 is fixed to the gear holder 5 with three screws 8 while the gear train 2 is accommodated in the accommodation recess 51.

A side wall of the gear holder 5 includes a flat motor attachment wall 52 to which the small DC motor 4 is fixed with screws 7. The DC motor 4 has an output shaft that extends to the accommodation recess 51 through a through hole 51e formed in the motor attachment wall 52. A worm gear 21 is press-fitted to the output shaft of the DC motor 4 in the accommodation recess 51 of the gear holder 5. The worm gear 21 functions as an output gear.

Light-blocking blades 60 are fixed to the output shaft of the DC motor 4. The light-blocking blades 60 rotate together with the output shaft of the DC motor 4, so that light emitted from a light emitting portion of a photo-interrupter (not shown) is incident on a light receiving portion while being intermittently blocked by the light-blocking blades 60. The DC motor 4 is controlled by counting the number of pulses output from the light receiving portion in response to the light incident on the light receiving portion.

The gear train 2, which realizes speed reduction, includes the worm gear 21, a helical gear 22 that meshes with the worm gear 21, a first gear 23 formed integrally with an upper portion of the helical gear 22, a second gear (first gear unit) 24 that is made of a resin material and that meshes with the first gear 23, a third gear (second gear unit) 25 that is made of a resin material and that is lightly press-fitted to a lower portion of the second gear 24, a fourth gear 26 that meshes with the third gear 25, a fifth gear 27 that is formed integrally with a lower portion of the fourth gear 26, and an output gear 28 that meshes with the fifth gear 27.

First to fourth shaft portions 51a to 51d stand in the accommodation recess 51 of the gear holder 5. The helical gear 22 and the first gear 23 are supported by the first shaft portion 51a. The second gear 24 and the third gear 25 are supported by the second shaft portion 51b. The fourth gear 26 and the fifth gear 27 are supported by the third shaft portion 51c. The output gear 28 is supported by the fourth shaft portion 51d.

Figure 2:
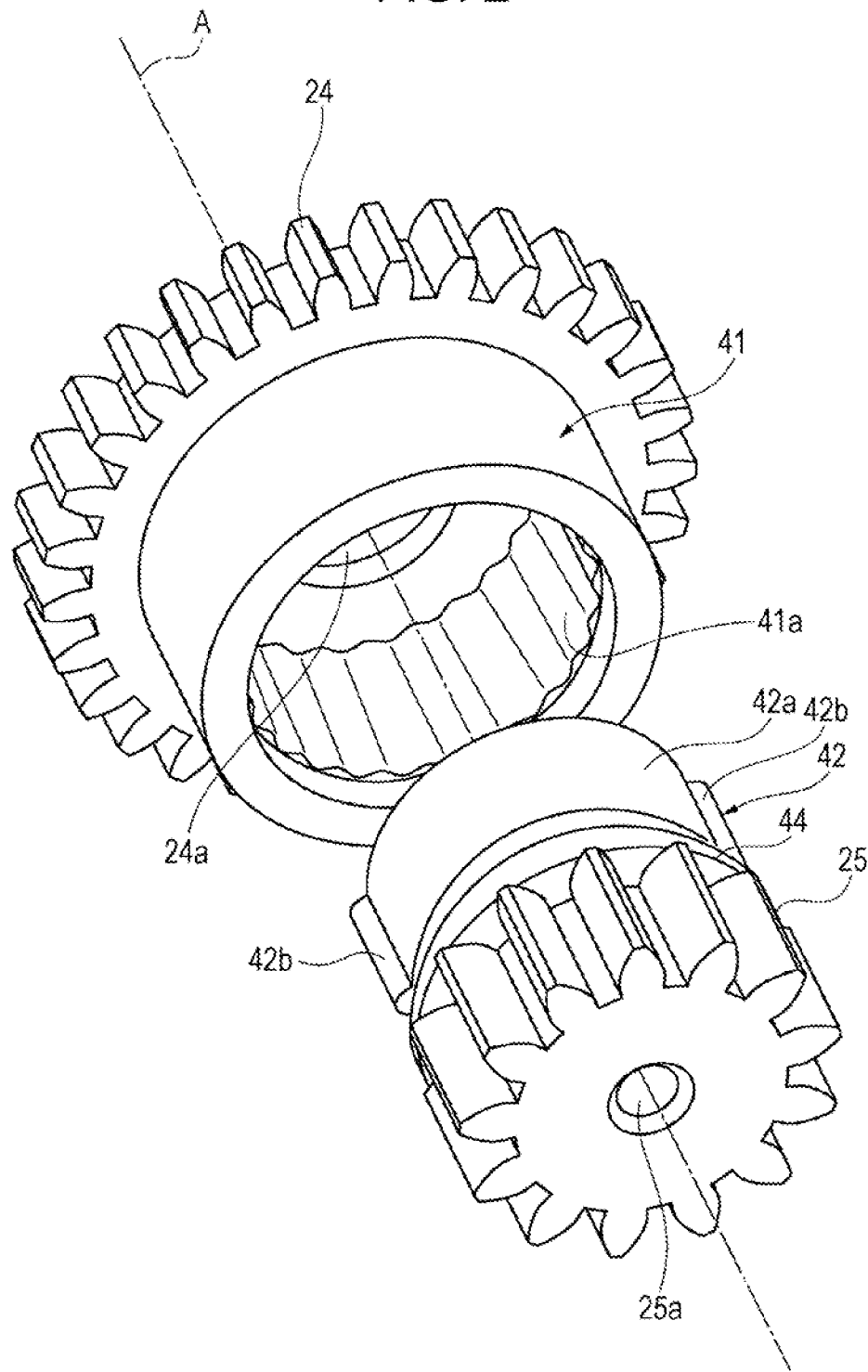
FIG. 2 is a perspective view of a second gear and a third gear.
Figure 3:
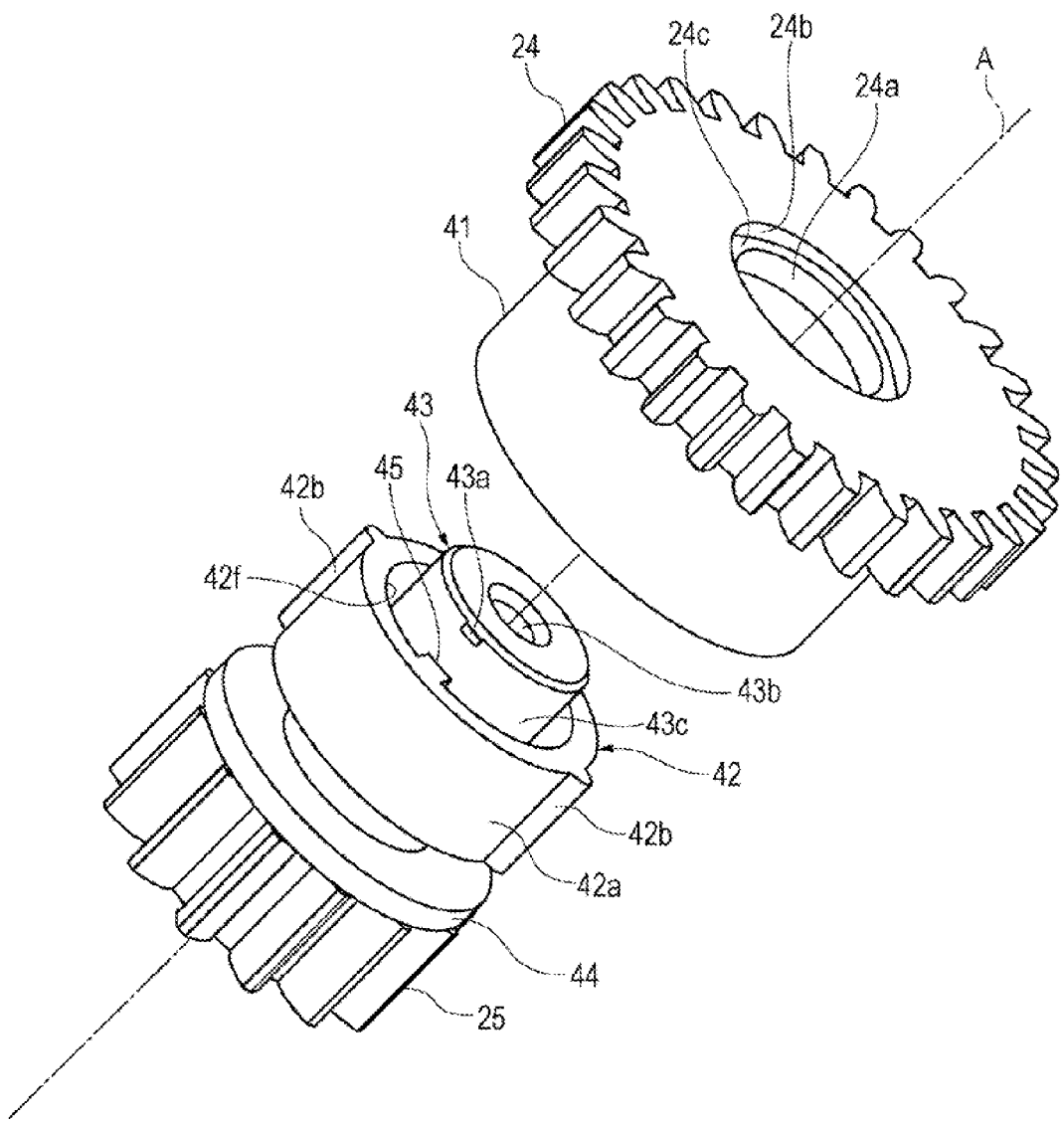
FIG. 3 is another perspective view of the second gear and the third gear.

As illustrated in FIGS. 2 and 3, the second gear (first gear unit) 24 is provided with a cylindrical portion 41 that is made of a resin, that has an annular shape in cross section, and that projects from the second gear 24 in a direction of rotation axis A. An inner peripheral surface of the cylindrical portion 41 includes a projecting-and-recessed portion 41a that extends continuously in the circumferential direction over the entire circumference thereof. An engagement recess 24b (see FIG. 3) is formed along the outer periphery of a center hole 24a in the second gear 24 by increasing the diameter of the center hole 24a.

The third gear (second gear unit) 25 is provided with a first insertion portion 42 that is cylindrical and made of a resin and a second insertion portion 43 that is also cylindrical and made of a resin. The first insertion portion 42 projects from the third gear 25 in the direction of rotation axis A and is inserted in the cylindrical portion 41. The second insertion portion 43 projects from an inner region of the first insertion portion 42 in the direction of rotation axis A and is inserted in the center hole 24a of the second gear 24.

Figure 6:
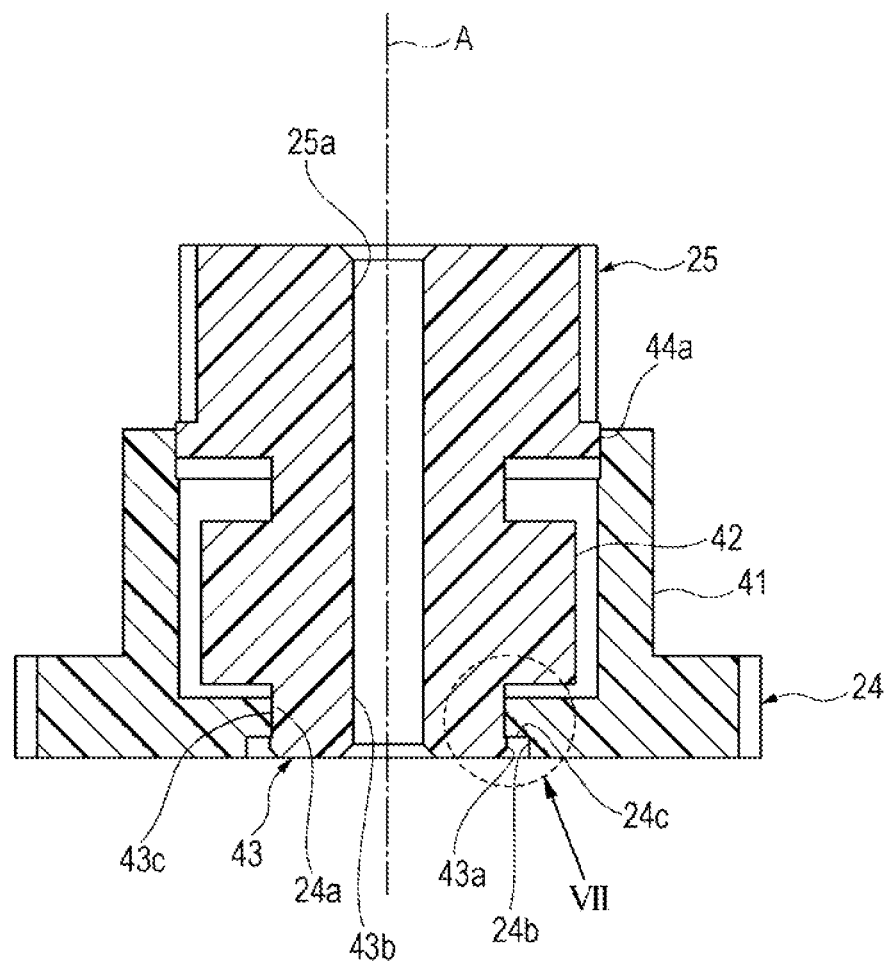
FIG. 6 is a sectional view illustrating the manner in which the second gear and the third gear are connected to each other.

As illustrated in FIGS. 3 and 6, a center hole 43b through which the second shaft portion 51b is inserted is formed in the second insertion portion 43. The second insertion portion 43 projects from a circular base 44, which is provided on the third gear 25, in the direction of rotation axis A. The center hole 43b in the second insertion portion 43 communicates with a center hole 25a (see FIG. 6) in the third gear 25. The second insertion portion 43 has engagement projections 43a that engage with a step portion 24c that extends in a direction orthogonal to the direction of rotation axis A in the engagement recess 24b of the second gear 24. Two engagement projections 43a are provided on an outer peripheral surface 43c of the second insertion portion 43 at the distal end of the second insertion portion 43, and are evenly arranged in the circumferential direction.

Figure 4:
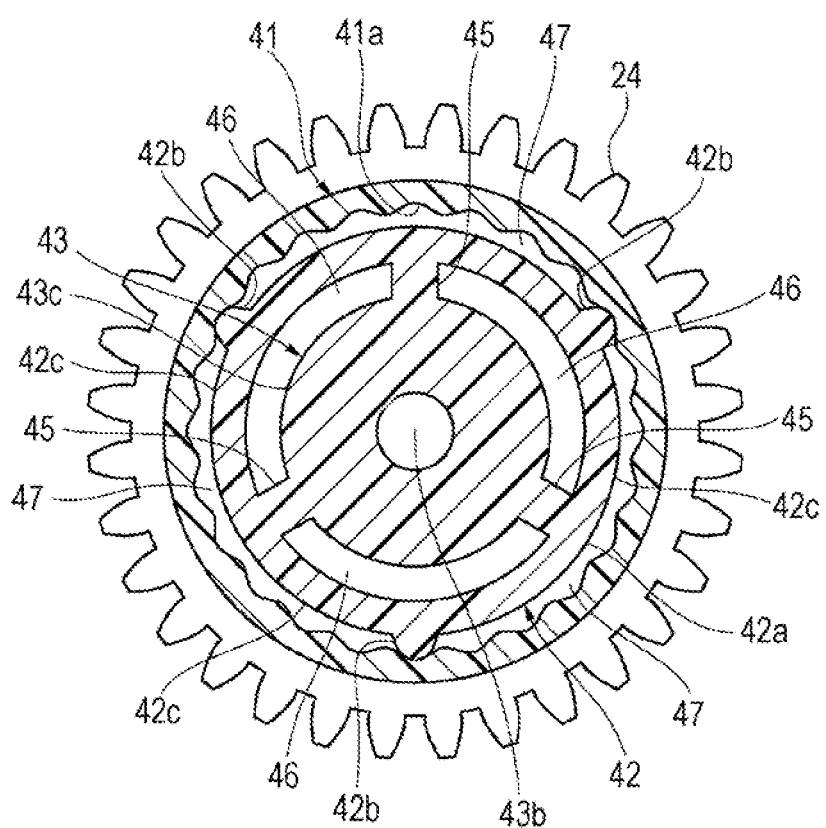
FIG. 4 is a sectional view illustrating the manner in which the second gear and the third gear are connected to each other.

Referring to FIGS. 2 to 4, the first insertion portion 42 is provided around an intermediate portion of the second insertion portion 43 with connecting portions 45 interposed therebetween. Three connecting portions 45 are evenly arranged in the circumferential direction. The connecting portions 45 extend radially from the outer peripheral surface 43c of the second insertion portion 43 to an inner peripheral surface 42f of the first insertion portion 42. The first insertion portion 42 is connected to the second insertion portion 43 with the connecting portions 45. Therefore, in plan view orthogonal to the rotation axis A, three spaces 46 that extend in the circumferential direction are provided between the first insertion portion 42 and the second insertion portion 43. The first insertion portion 42 includes arch portions 42c that are made of a resin and that extend in the circumferential direction, and the arch portions 42c connect the connecting portions 45 that are adjacent to each other in the circumferential direction. Accordingly, the arch portions 42c can be softly bent in the radial direction, so that vibrations and the like can be absorbed by the arch portions 42c.

Pressing portions 42b for pressing the projecting-and-recessed portion 41a of the cylindrical portion 41 in the radial direction are provided on central portions of the arch portions 42c in the circumferential direction. In plan view orthogonal to the rotation axis A, the pressing portions 42b are located at the midpoints between the connecting portions 45 that are adjacent to each other in the circumferential direction. Accordingly, when the first insertion portion 42 is inserted in the cylindrical portion 41, rattling of the third gear 25 with respect to the second gear 24 can be suppressed and rotation of the third gear 25 with respect to the second gear 24 can be stabilized.

Figure 5:
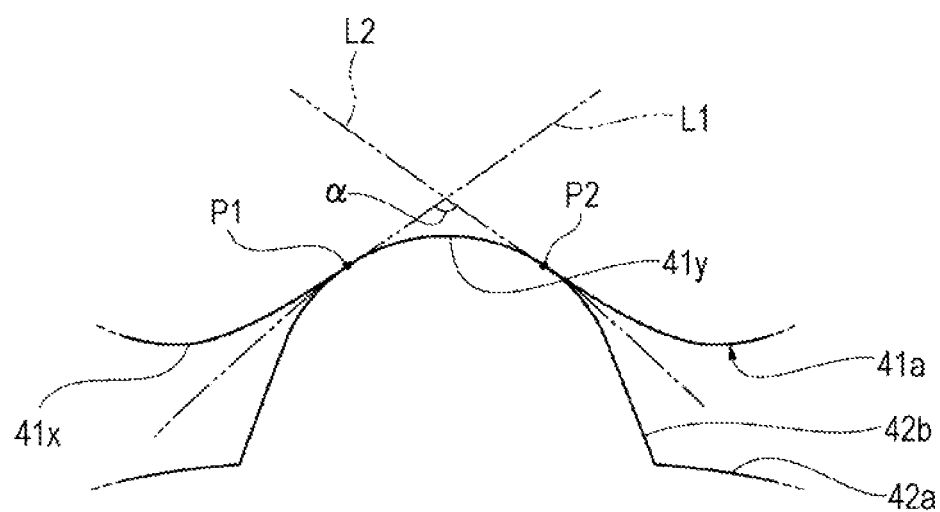
FIG. 5 is an enlarged partial plan view illustrating the relationship between a recess in an inner peripheral surface of a cylindrical portion and a projection on an outer peripheral surface of a first insertion portion.

As illustrated in FIG. 5, each pressing portion 42b of the first insertion portion 42 projects from an outer peripheral surface 42a of the first insertion portion 42, and has a curved end. In plan view orthogonal to the rotation axis A, the projecting-and-recessed portion 41a formed on the inner peripheral surface of the cylindrical portion 41 includes projections 41x and recesses 41y that are alternately arranged in a continuous manner. Each recess 41y is shaped so as to have inflection points at a reference point P1 and a reference point P2 and form an arc that connects the reference point P1 and the reference point P2. Each projection 41x is shaped so as to form an arc that connects the recesses 41y that are adjacent to the projection 41x in the circumferential direction. A reference line L1, which is a tangent line that passes through the reference point P1, and a reference line L2, which is a tangent line that passes through the reference point P2, form an obtuse angle α. Thus, the projections 41x and the recesses 41y are gently curved and the projecting-and-recessed portion 41a has a wavy shape.

Figure 7:
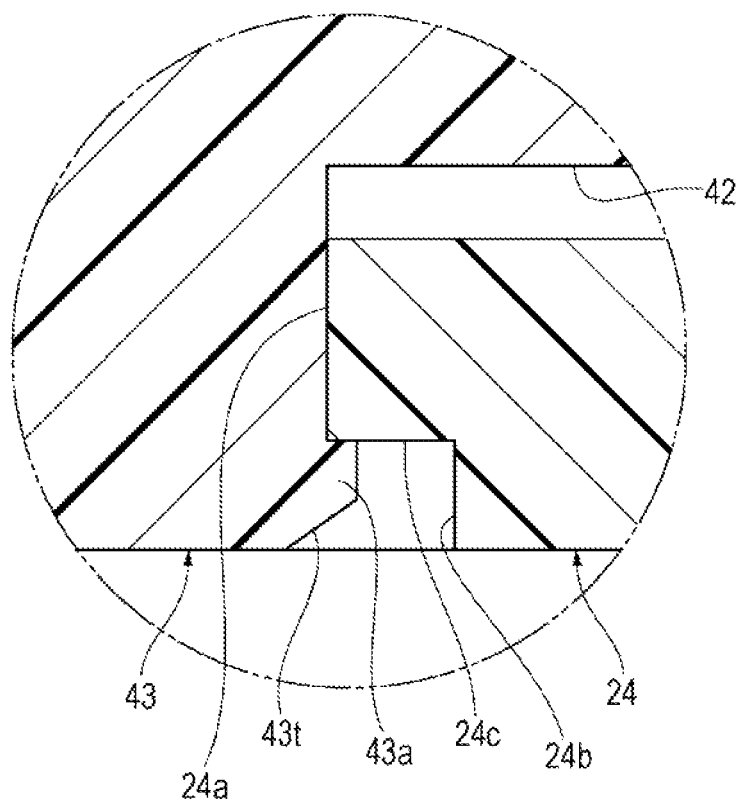
FIG. 7 is an enlarged view of a part circled by the dashed line in FIG. 6.

Referring to FIGS. 6 and 7, the first insertion portion 42 is inserted in the cylindrical portion 41, and the second insertion portion 43 is inserted in the center hole 24a. As illustrated in FIG. 7, which is an enlarged view of part VII, the engagement projections 43a are chamfered at the distal end of the second insertion portion 43. The engagement projections 43a are pushed into the center hole 24a by being pressed at the tapered surfaces 43t, and are fitted into the engagement recess 24b when the engagement projections 43a pass over the wall surface of the center hole 24a. Thus, the engagement projections 43a are engaged with the engagement recess 24b. As illustrated in FIG. 6, the outer peripheral surface 43c of the second insertion portion 43 contacts the wall surface of the center hole 24a of the second gear 24 and an outer peripheral surface 44a of the circular base 44 contacts the inner peripheral surface of the cylindrical portion 41, so that the third gear 25 and the second gear 24 have the same rotation axis A.

In the geared motor 1 having the above-described structure, the first insertion portion 42 of the third gear 25 made of a resin is inserted in the cylindrical portion 41 of the second gear 24 made of a resin. Also, as illustrated in FIG. 4, the projecting-and-recessed portion 41a provided on the inner peripheral surface the cylindrical portion 41 is pressed in the radial direction by the pressing portions 42b on the first insertion portion 42. Thus, the third gear 25 is lightly press-fitted to the second gear 24 in the direction of rotation axis A. Therefore, in a locked state, the pressing portions 42b on the first insertion portion 42 of the third gear 25 move in the circumferential direction along the projecting-and-recessed portion 41a of the inner peripheral surface of the cylindrical portion 41 of the second gear 24. The pressing portions 42b on the first insertion portion 42 move along the projecting-and-recessed portion 41a of the inner peripheral surface of the cylindrical portion 41, so that torque is not transmitted between the second gear 24 and the third gear 25. Since the projecting-and-recessed portion 41a of the cylindrical portion 41 of the second gear 24 is pressed in the radial direction by the pressing portions 42b on the first insertion portion 42 of the third gear 25, the rotating force can be reliably transmitted between the second gear 24 and the third gear 25. When viewed in the direction of rotation axis A, the projecting-and-recessed portion 41a of the cylindrical portion 41 is formed over the entire circumference, and the three pressing portions 42b on the first insertion portion 42 are evenly arranged in the circumferential direction. Therefore, rattling of the third gear 25 with respect to the second gear 24 can be suppressed and rotation of the third gear 25 with respect to the second gear 24 can be stabilized.

The third gear 25 includes the second insertion portion 43 that is inserted in the center hole 24a of the second gear 24. The engagement projections 43a are provided on the outer peripheral surface 43c of the second insertion portion 43. The engagement projections 43a are engaged with the step portion 24c of the engagement recess 24b, which is formed in the center hole 24a of the second gear 24, in the direction of rotation axis A. The engagement projections 43a of the second insertion portion 43 of the third gear 25 are placed in the engagement recess 24b in the center hole 24a of the second gear 24. Therefore, when a force is applied to the second gear 24 or the third gear 25 in the direction of rotation axis A, the engagement projections 43a contact the step portion 24c of the engagement recess 24b. Thus, movement of the third gear 25 with respect to the second gear 24 in the direction of rotation axis A is regulated, and the third gear 25 is reliably prevented from being pulled out from the second gear 24. In particular, in the case where the gear train 2 includes the worm gear 21 or the like, a force is easily applied in the direction of rotation axis A. Therefore, the above-described structure is very effective.

The pressing portions 42b provided on the outer peripheral surface 42a of the first insertion portion 42 of the third gear 25 are projections having curved ends. As illustrated in FIG. 5, each of the recesses 41y formed in the inner peripheral surface of the cylindrical portion 41 of the second gear 24 is gently curved so that the reference lines L1 and L2 form an obtuse angle α. Thus, the pressing portions 42b on the first insertion portion 42 of the third gear 25 have curved ends, and the recesses 41y in the cylindrical portion 41 of the second gear 24 are gently curved. Therefore, compared to the case in which the radius of curvature of each recess 41y is reduced so that the reference lines L1 and L2 form an acute angle, the pressing force applied by the pressing portions 42b of the third gear 25 to the inner peripheral surface of the cylindrical portion 41 in the circumferential direction is reduced. Accordingly, the pressing portions 42b of the third gear 25 smoothly move along the projections 41x and the recesses 41y of the cylindrical portion 41 of the second gear 24, and the projections 41x of the cylindrical portion 41 do not easily wear away. Thus, in a locked state, the pressing portions 42b of the third gear 25 can be moved smoothly along the inner peripheral surface of the cylindrical portion 41 of the second gear 24 in the circumferential direction, and wear of the projections 41x on the cylindrical portion 41 can be reduced.

The geared motor 1 may be mounted in a camera and used as a drive source for moving a lens fixed to a lens barrel in an optical axis direction.

An example of such a camera will now be described. The lens barrel includes an inner barrel to which the lens is fixed and an outer barrel that has a rack gear formed on the outer periphery thereof. The inner barrel and the outer barrel are connected to each other with a cam mechanism. When the outer barrel is rotated in the circumferential direction, the inner barrel is moved in the optical axis direction by the cam mechanism The rack gear on the outer barrel is engaged with the output gear 28 of the geared motor 1. The inner barrel, that is, the lens, can be moved in the optical axis direction by causing the output gear 28 to rotate the outer barrel in the circumferential direction.

The present invention is not limited to the above-described embodiment.

Figure 8:
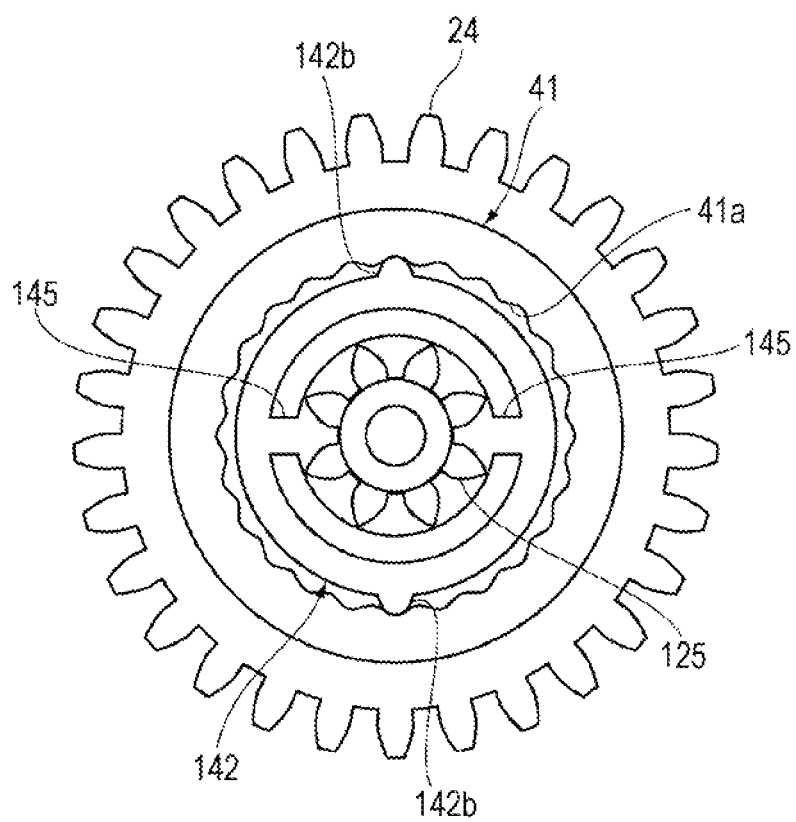
FIG. 8 is a plan view illustrating the second gear and a sixth gear.

As illustrated in FIG. 8, in the second gear 24 and the third gear 25, the first insertion portion 42, on which the three pressing portions 42b are evenly arranged in the circumferential direction, and the connecting portions 45 may be replaced by a third insertion portion 142, on which two pressing portions 142b are evenly arranged in the circumferential direction, and connecting portions 145. In addition, the third gear 25 may be replaced by a sixth gear 125 that has a smaller radius and a smaller number of teeth than those of the third gear 25.

What is claimed is:

1. A geared motor that reduces a speed of rotation of a motor with a plurality of gears and outputs the rotation to the outside, the geared motor comprising:
   the plurality of gears including
      a first gear unit including a cylindrical portion, and
      a second gear unit including a first insertion portion that is inserted in the cylindrical portion of the first gear unit,
   wherein the first gear unit and the second gear unit are made of a resin material,
   wherein an inner peripheral surface of the cylindrical portion of the first gear unit includes a projecting-and-recessed portion that extends continuously in a circumferential direction over the entire circumference of the inner peripheral surface of the cylindrical portion,
   wherein pressing portions are evenly arranged in the circumferential direction on an outer peripheral surface of the first insertion portion of the second gear unit, the pressing portions being configured to enter recesses included in the projecting-and-recessed portion and press wall surfaces of the recesses,
   wherein the second gear unit includes
      a second insertion portion that projects from an inner region of the first insertion portion in an axial direction, and
      a circular base that is provided on the second gear unit in the axial direction,
   wherein an outer peripheral surface of the second insertion portion contacts a wall surface of a center hole of the first gear unit,
   wherein an outer peripheral surface of the circular base contacts the inner peripheral surface of the cylindrical portion of the first gear unit, and
   wherein the pressing portions of the first insertion portion are provided in the axial direction between the outer peripheral surface of the second insertion portion and the outer peripheral surface of the circular base.

2. The geared motor according to claim 1, wherein an engagement projection is provided on an outer peripheral surface of the second insertion portion, the engagement projection being engaged with an engagement recess in a wall surface of the center hole in the axial direction.

3. The geared motor according to claim 2, wherein each of the pressing portions is a projection having a curved end, and wherein the wall surface of each of the recesses in the inner peripheral surface of the cylindrical portion of the first gear unit is curved between two reference lines, which are tangent lines of the wall surface, when viewed in the axial direction, the two reference lines forming an obtuse angle.

4. The geared motor according to claim 1, wherein each of the pressing portions is a projection having a curved end, and wherein the wall surface of each of the recesses in the inner peripheral surface of the cylindrical portion of the first gear unit is curved between two reference lines, which are tangent lines of the wall surface, when viewed in the axial direction, the two reference lines forming an obtuse angle.

* * * * *